April 23, 1946.  L. W. SMITH  2,398,972
DEVICE FOR INDICATING THE SLOPE OF GRAIN OF STRUCTURAL LUMBER
Filed May 7, 1943  2 Sheets-Sheet 1
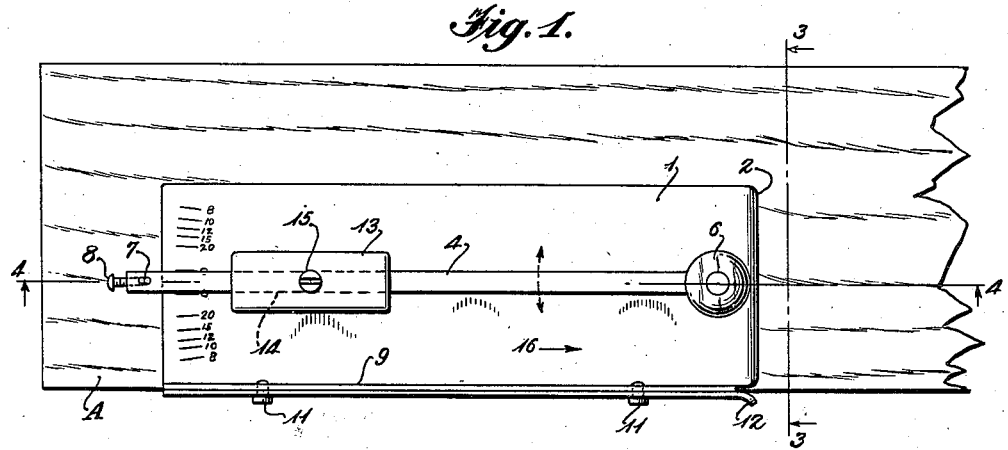
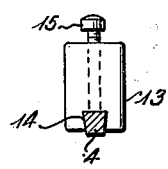
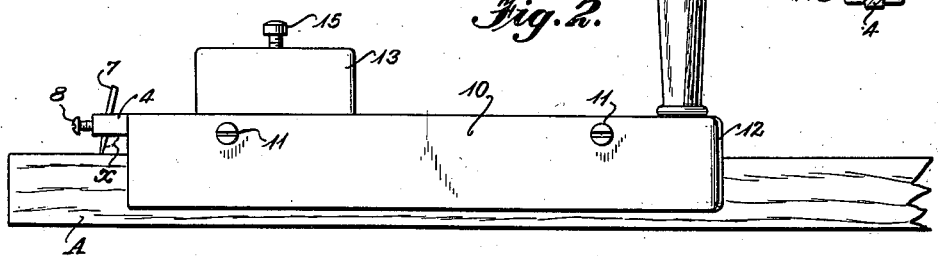
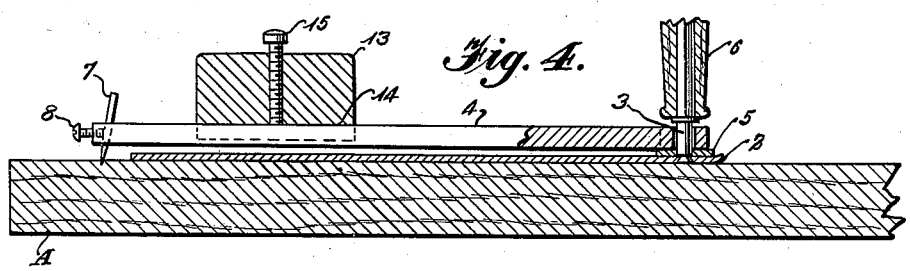
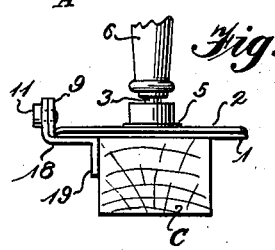
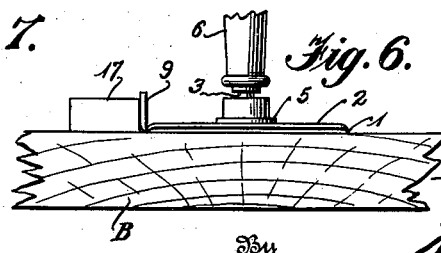
Inventor
Lawrence W. Smith
By James P. Burns
Attorney April 23, 1946.  L. W. SMITH  2,398,972
DEVICE FOR INDICATING THE SLOPE OF GRAIN OF STRUCTURAL LUMBER
Filed May 7, 1943  2 Sheets-Sheet 2
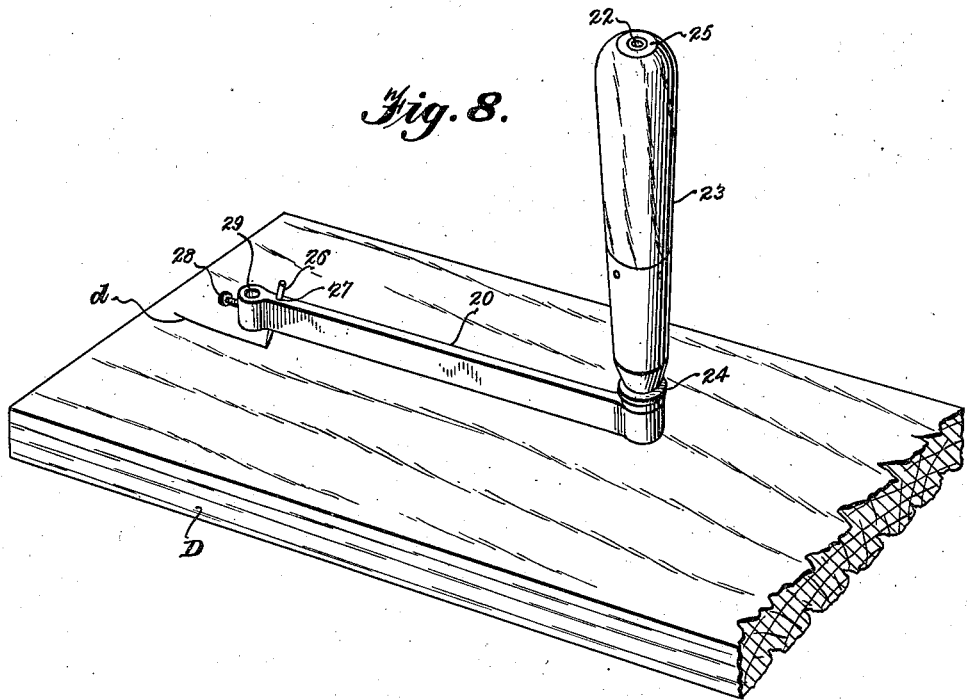
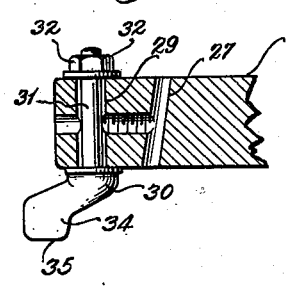
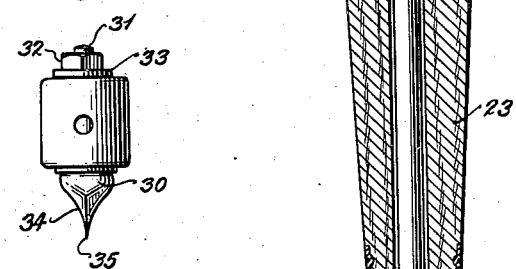
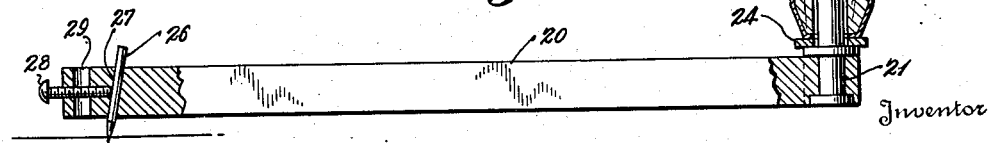
Inventor
Lawrence W. Smith
By James P. Burns
Attorney Patented Apr. 23, 1946

2,398,972

UNITED STATES PATENT OFFICE 2,398,972

DEVICE FOR INDICATING THE SLOPE OF GRAIN OF STRUCTURAL LUMBER

Lawrence W. Smith, Washington, D. C., assignor to Timber Engineering Company, Washington, D. C., a corporation of Delaware Application May 7, 1943, Serial No. 486,030

4 Claims. (Cl. 33—1)

This invention relates to a device for indicating slope of grain in structural lumber.

The specifications for structural lumber, more particularly that used for aircraft and other exacting purposes, include specific limitations in respect to the slope of grain permissible.

The expression "slope of grain" is defined in American Lumber Standards Simplified Practice Recommendation R16-39, of the National Bureau of Standards, as "deviation of the fibre from a line parallel to the sides of the piece."

The Army and Navy Aeronautical Specifications specify that in general the slope of grain shall not be steeper than 1 inch in 15 inches in a linear direction on the face of the piece. Lumber inspectors have encountered a great deal of difficulty in determining slope of grain of structural lumber because of the lack of any dependable instrument to give an accurate indication of slope of grain. Inspectors have, in the past, been very largely limited to determinations made by visual observation. Such determinations require great skill and experience and are even then extremely uncertain and frequently inadequate.

The present invention contemplates the provision of a dependable and exceedingly simple device for indicating slope of grain in structural lumber adapted to facilitate the inspection of such lumber and to provide an accurate means for determining slope of grain.

In its more specific purposes, the invention contemplates a device of great versatility which may, in its more simplified form, be employed in aid of determinations made by skilled lumber inspectors, and which may, in its more refined forms, be utilized by unskilled persons in making accurate slope of grain determinations.

In the main, the invention contemplates the provision of a device for indicating slope of grain in structural lumber which may be drawn generally longitudinally of the piece of lumber, the slope of grain of which is to be determined and an indication of the slope of grain obtained through the medium of a timber engaging scribing element which follows the direction of the fibres of the lumber as the device is moved along the piece.

Further and more detailed objects of the invention will become apparent as the description proceeds, which will be given in conjunction with the accompanying drawings which form a part hereof and in which:

Figure 1 is a top plan view of a more refined form of the invention showing the same in position on a piece of structural lumber.

Figure 2 is a view in side elevation of the form of the invention shown in Fig. 1.

Figure 3 is an end view in the direction of the line 3—3 of Fig. 1, with a portion of the handle broken away.

Figure 4 is a sectional view on the line 4—4 of Fig. 1.

Figure 5 is a detailed view showing the application of the adjustable weight shown in Fig. 1.

Figure 6 is a view illustrating the adaptation of the invention for use with a straight edge on large and irregularly shaped timbers.

Figure 7 is an illustration of the special adaptation of the form of the invention shown in Fig. 1 to narrow lumber pieces.

Figure 8 is a perspective view of a simplified form of the invention showing its mode of use.

Figure 9 is a side elevational view with parts in section of the simplified device shown in Fig. 8.

Figures 10 and 11 are detailed views of a modified form of stylus or timber engaging element.

Referring first to the form of the invention shown in Figs. 1 to 7, the device embraces a primary support 1 adapted to be moved longitudinally along a piece of structural lumber, such as indicated at A. The support 1 preferably has its forward end slightly turned up as indicated at 2 to facilitate movement of the device over the face of the piece of lumber. The support 1 carries a pivotal bearing 3 on which is pivotally mounted the bar 4. The relation of the bar 4 to the pivotal bearing 3 is such that the bar 4 has a free pendulum-like action in a horizontal plane above the support 1. To facilitate the free pivotal action of the bar 4, an appropriate anti-friction element 5 may be provided. The pivotal bearing 3, which in the form shown is rigid with the support 1, projects upwardly and carries a suitable handle 6. The free end of the pivoted bar 4 carries a scribing element or stylus 7 held in adjustable position at the free end of the bar 4 by the clamping screw 8. It will be observed that the scribing element or stylus 7 extends downwardly from the bar 4 at an angle thereto in the direction of the free end of the bar 4. This angle is indicated at $x$ in Fig. 2, and it has been found that this angle must be greater than 90 degrees and that it should preferably lie within the limits of from 95 to 125 degrees, good results being obtained at an angle of approximately 100 degrees.

In the form of the invention shown in Figs. 1 to 4, the longitudinally extending vertical flange 9 of the support 1 carries an attached vertical plate 10 secured to the flange 9 through the medium of the screws 11. The forward end of the vertical side plate 10 is preferably flared outwardly as indicated at 12 in a manner similar to the upward flare 2 of the horizontal plate of the support 1.

The pivoted bar 4 advantageously is of keystone configuration as shown in cross section in Fig. 5, and carries the adjustable weight 13 provided with a corresponding keystone slot 14 and adapted to be held in any longitudinal position of adjustment on the bar 4 by the clamping screw 15.

When the support 1 is placed upon the face of a piece of structural lumber such as A with the side plate 10 parallel to and in contact with the edge of the piece, the point of the stylus 7 should be positioned midway of the O—O position shown by the calibrations on the support 1 in Fig. 1. The weight 13 and the bar 4 will cause the point of the stylus 7 to slightly penetrate into the fibres of the face of the piece A. In this position, the device is ready for use.

By grasping the handle 6 and pulling the device longitudinally of the piece in the direction of the arrow 16 (Fig. 1), the point of the stylus 7 will precisely follow the direction of the fibres of the piece and thus take the direction of the slope of grain thereof. In Fig. 1, the device is shown as calibrated for a 6-inch linear movement of the stylus 7. The reading given upon a 6-inch linear movement of the device will represent the extent in inches of deviation of the slope of grain from a line parallel to the edge of the piece for the linear dimensions given in the calibration. For example, if, upon movement of the device as shown in Fig. 1, a distance of 6 inches along the piece A, the bar 4 is caused to pivot either to the right or left so that the calibrated reading is 20, this indicates that the slope of grain is 1 inch in a 20-inch length of the piece. Likewise, if the reading is 15, it indicates a 1-inch deviation in a 15-inch length of the piece, and so on for the several calibrations.

It will be understood that the device may be calibrated for any desired linear movement of the stylus. Calibrations based upon a linear movement for approximately the length of the support 1 render the device capable of easy and simple use. With such calibrations, by placing the device on a piece of lumber in the position shown in Fig. 1, a pencil line may be drawn on the face of the piece along the upturned end 2 of the support 1. The device can then be drawn until the stylus 7 reaches the transverse pencil mark. At this point, the calibrated reading may be observed.

In Fig. 6, the device is shown with the vertical side plate 10 removed. In this case, the flange 9 of the support 1 is merely drawn along the side of a straight edge 17. The piece of structural lumber indicated at B in Fig. 6 may be of large or irregular dimensions such as to make it impractical to use the vertical guide plate 10. By using the straight edge 17, the slope of grain at any point across the face of the timber may be accurately determined. The device as illustrated in Fig. 6 apart from the removal of the guide plate 10 and the employment in lieu thereof of the straight edge 17, functions in all respects the same as the device as illustrated in Figs. 1 to 4.

In Fig. 7, the vertical side plate 10 has also been removed and in lieu thereof the right angle extension guide plate 18 has been substituted. It will be noted that the plate 18 extends inwardly of the side of the support 1 and is provided with a downwardly turned guiding extension 19. Through the medium of the angle guide plate 18, the device may be effectively utilized in determining the slope of grain on the edge of timbers as well as upon rather small pieces of lumber, such as indicated at C in Fig. 7.

Referring next to the simplified form of the invention illustrated in Figs. 8 and 9, it will be noted that in this form the elongated bar 20 is rigidly attached at 21 to the bar 22 which extends through and has free pivotal movement in the handle member 23. The handle 23 is held in assembled position on the bar 22 between the washers 24 and 25. In this form of the invention, a pointed stylus 26 is mounted in adjustable position in the bore 27 adjacent the free end of the bar 20 and held in adjusted position by the clamping screw 28. As in the form of the invention illustrated in Figs. 1 to 4, the stylus projects downwardly from the bar 20 at an angle greater than 90 degrees in the direction of the free end of the bar 20. The free end of the bar 20 is also provided with a somewhat larger bore 29 for a purpose to be later described.

The form of the invention illustrated in Figs. 8 and 9 is particularly adapted for use by skilled lumber inspectors in the field. The manner of use of this form of the invention is as follows. The inspector grasps the handle 23 and holds the bar 20 in parallel relation to the face of a piece of lumber such as the piece D in Fig. 8, and slightly indents the point of the stylus 26 into the face of the lumber. The device is then drawn longitudinally of the piece of lumber, thereby scribing a line such as indicated at d on the face of the piece D of Fig. 8. When the device has been drawn for a substantial distance along the face of the piece, the inspector can, by sighting longitudinally of the piece, readily and quite accurately note the slope of grain as indicated by the thus scribed line.

In Figs. 10 and 11, there is illustrated a somewhat different form of sharpened timber engaging element for use in association with the device. In this case, there is pivotally mounted in the bore 29 adjacent the end of the bar 20 a caster 30 embracing the pivot bearing 31 adapted to be held in pivotal relation to the bore 29 by the nut 32 employed in association with the washer 33. It will be noted that the depending sharpened portion 34 of the caster 30 extends downwardly from the bar 20 at an angle substantially greater than 90 degrees in the direction of the free end of the bar, and terminates in a short scribing blade 35. The caster 30 may in some instances be used in lieu of the stylus 26. For finished lumber, the stylus 26 is preferable. However, in those instances where slope of grain of rough or unfinished lumber is to be indicated, the bladed caster 30 will be found advantageous.

It is also to be understood that the bar 20 of the modifications illustrated in Figs. 8 to 11 may be provided with an adjustable weight such as the weight 13 and associated clamping screw 15 shown, for example, in Fig. 4.

As earlier indicated, the form of the invention illustrated in Figs. 8 and 9 is primarily intended for use by experienced timber inspectors whereas the more refined form of the invention illustrated in Figs. 1 to 7 is particularly well adapted for use in mills and by persons unskilled in the inspection of structural lumber.

From the foregoing, it will be apparent that the present invention provides a simple and effective device for indicating the slope of grain in structural lumber, and it is to be understood that the particular embodiments depicted in the accompanying drawings and described in this specification are an exemplification of the invention and not a limitation thereof, the scope of the invention being indicated by the subjoined claims.

Having thus described the invention, I claim:

1. A device for indicating slope of grain in structural lumber comprising a support, a longitudinally extending bar pivotally carried at a fixed point by said support, a sharpened timber engaging element carried adjacent the free end of said pivotally supported bar adapted to be slightly indented into the face of a piece of structural lumber the slope of grain of which is to be determined, and to follow the grain of said piece of lumber as said support is moved longitudinally of the piece of lumber, means carried by said support for guiding the same as it is drawn along the piece of lumber, a handle associated with said support, and calibrations on said support so positioned in respect to said pivoted bar as to give a direct reading of slope of grain when the device is drawn along a piece of lumber.

2. A device for indicating the slope of grain in structural lumber comprising a support, means for guiding said support over the surface of a piece of structural lumber in parallel relationship to the edge thereof as said support is drawn along the piece of lumber, a bar mounted for free pivotal movement about a fixed point on said support, a sharp lumber engaging element depending from said bar in spaced relationship to said fixed pivot point, said lumber engaging element being arranged to engage the surface of the piece of lumber and to follow the grain thereof with resulting pivotal movement of said bar as said device is drawn along the piece of lumber, and calibrations on said support for indicating the extent of pivotal movement of said bar.

3. A device for indicating the slope of grain in structural lumber comprising a support, means for guiding said support over the surface of a piece of structural lumber in parallel relationship to the edge thereof as said support is drawn along the piece of lumber, a bar mounted for free pivotal movement about a fixed point on said support, a sharp lumber engaging element on said bar in spaced relationship to said fixed pivot point, said element extending downwardly from said bar and rearwardly with respect to the direction of movement of said support and being arranged to engage the surface of a piece of lumber and to follow the grain thereof with resulting pivotal movement of said bar as said device is drawn along the piece of lumber, and calibrations on said support for indicating the extent of pivotal movement of said bar.

4. A device for indicating slope of grain in structural lumber comprising a handle member adapted to be positioned generally normal to a surface of a piece of structural lumber the slope of grain of which is to be indicated, an elongated bar having one end pivotally supported with respect to said handle member and arranged to pivot about said handle member in a plane generally parallel to said surface of said piece, a sharp lumber engaging element extending downwardly and outwardly from said bar adjacent the free end thereof and at a point remote from said handle member, said lumber engaging element being arranged to engage said surface and scribe a line following the grain thereof as said handle member is drawn longitudinally of said piece in a line parallel to a marginal edge thereof while said elongated bar is free to pivot about said handle member.

LAWRENCE W. SMITH.